United States Patent
Kehrer et al.

(10) Patent No.: US 8,807,541 B2
(45) Date of Patent: Aug. 19, 2014

(54) MASS TRANSFER COLUMN AND A CROWN ELEMENT FOR A MASS TRANSFER COLUMN

(75) Inventors: Florian Kehrer, Effretikon (CH); Curdin Flisch, Uesslingen (CH)

(73) Assignee: Sulzer Chemtech AG, Winterthur (CH)

( * ) Notice: Subject to any disclaimer, the term of this patent is extended or adjusted under 35 U.S.C. 154(b) by 415 days.

(21) Appl. No.: 13/066,119

(22) Filed: Apr. 7, 2011

(65) Prior Publication Data

US 2011/0253848 A1     Oct. 20, 2011

(30) Foreign Application Priority Data

Apr. 20, 2010   (EP) ..................... 10160425

(51) Int. Cl.
*C10J 1/08*   (2006.01)
*B01J 19/32*  (2006.01)

(52) U.S. Cl.
CPC ........ *B01J 19/32* (2013.01); *B01J 2219/32275* (2013.01); *B01J 19/325* (2013.01); *B01J 2219/3221* (2013.01); *Y10S 261/72* (2013.01)
USPC ................................ 261/112.2; 261/DIG. 72

(58) Field of Classification Search
USPC ............................ 261/112.1, 112.2, DIG. 72
See application file for complete search history.

(56) References Cited

U.S. PATENT DOCUMENTS

| | | | |
|---|---|---|---|
| 5,441,793 A * | 8/1995 | Suess | 428/192 |
| 5,456,865 A * | 10/1995 | Pluess et al. | 261/112.1 |
| 6,170,805 B1 * | 1/2001 | Hug et al. | 261/112.2 |
| 8,475,910 B2 * | 7/2013 | Thiagarajan | 428/182 |

FOREIGN PATENT DOCUMENTS

| | | |
|---|---|---|
| DE | 195 20 802 A1 | 12/1996 |
| FR | 2 672 815 A1 | 8/1992 |
| GB | 2 338 194 A | 12/1999 |
| JP | 8 000983 A | 1/1996 |

* cited by examiner

*Primary Examiner* — Gwendolyn W Baxter
(74) *Attorney, Agent, or Firm* — Francis C. Hano; Carella, Byrne, et al.

(57) ABSTRACT

The crown element for securing a packing in a mass transfer column comprises an elongate sheet which comprises a roof element, a wall element and a bottom element. A first bending line is formed between the roof element and the wall element and a second bending line is formed between the wall element and the bottom element. Incisions are formed in the roof element and grooves are formed in the bottom element. The number of incisions is smaller than the number of grooves.

14 Claims, 3 Drawing Sheets

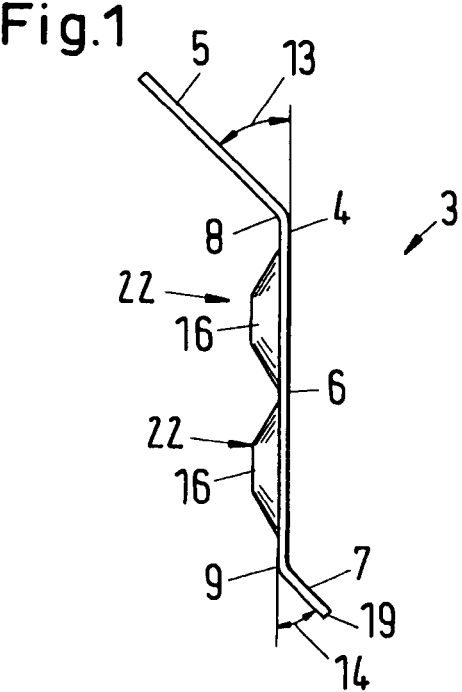
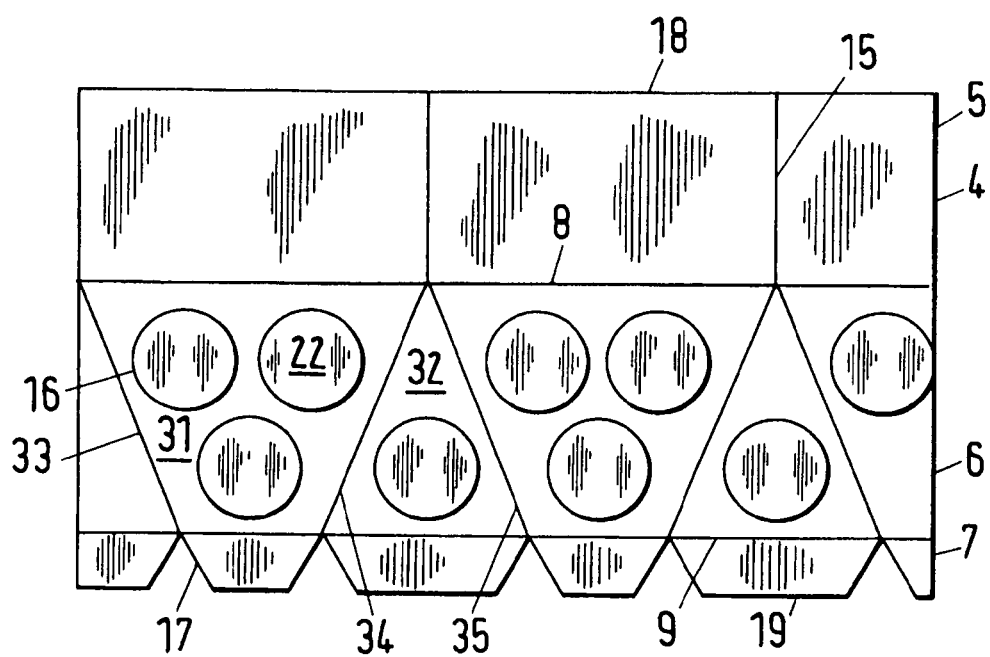

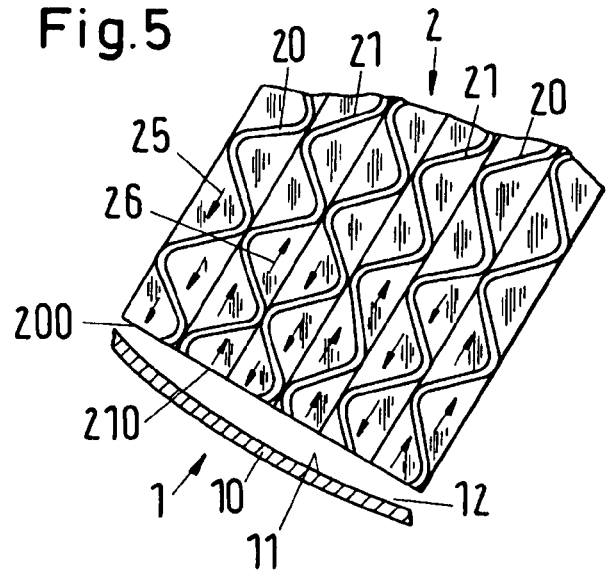
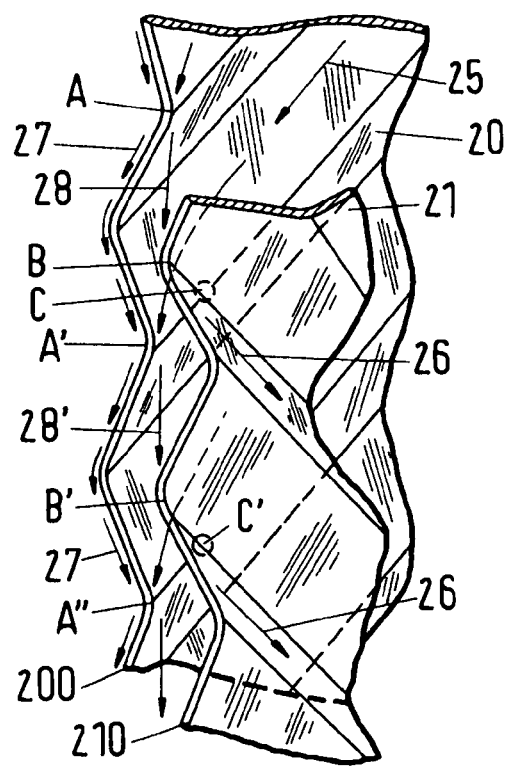

MASS TRANSFER COLUMN AND A CROWN ELEMENT FOR A MASS TRANSFER COLUMN

This invention relates to a crown element for a packing of a mass transfer column. The invention also relates to a mass transfer column having crown elements for packings.

BACKGROUND OF THE INVENTION

The exchange part of a mass transfer column in which, in particular, an upwards flowing gas and a counter-flowing liquid are brought into contact, consists of a packing which fills the cross-section of the column out to an annular gap at the column wall. The crown elements which encircle the packing serve for the deflection of these flows of matter. The gas flow is forced into the packing by the crown elements; the gas is thereby impeded from partially flowing through along the region at the edge of the column without coming into contact with the liquid. The packing is in particular an ordered packing which brings about a distribution of the two flows of matter across the cross-section of the column. Such a crown element is for instance disclosed in U.S. Pat. No. 5,456,865 or JP08-000983 A.

The packing is composed, for example, of layers of undulating corrugations or laminations folded in a zigzag. The corrugations consist of a material like foil; the edges at the folds or ridges extend in a direction inclined with respect to the axis of the column, for example, at an angle to the axis amounting of 45 DEG or 30 DEG. The layers formed by the corrugations are aligned in parallel with the axis; with respect to the slope of the edges at the folds they are arranged alternately so that open channels result which run obliquely and cross. The packing is organized in sections which differ in the orientation of the layering. Between adjacent sections the orientation changes each time through approximately 90 DEG.

Through the oblique channels in the packing, part of the liquid flows to the region at the edge. To prevent this liquid from contacting the column wall an edge gap is provided, that is, the above-mentioned annular gap. Without the edge gap a considerable part of the liquid would flow down along the column wall.

By means of the edge gap, it becomes possible for the liquid arriving at the edge of the packing to be returned into the interior of the packing again through other channels. However, it cannot be avoided in practice that a certain proportion of the liquid does spill over against the column wall and thereby impair the mass transfer process. The crown elements have the additional function of conducting the liquid back from the column wall to the packing where the liquid is subsequently led through some of the channels back into the interior of the packing.

Further examples of ordered packings, which bring about a distribution of the two flows of matter across the cross-section of column, are described in the European Patents EP 0 070 917 B1 and EP 0 069 241 B1.

A packing of a mass transfer column comprises at least one packing element. A plurality of packing elements can be stacked upon each other to form a stack. A packing element is defined as an assembly of packing layers forming a substantially cylindrically shaped structure or any other structure fitting into the interior of the mass transfer column. Such a packing element can be subdivided into a plurality of packing segments. The packing segments can thus be considered as the slices forming a packing element.

For simple mounting of the column, it is necessary for the crown elements (i.e. collars) to be fastened to the built-in elements already before installing the packing. Since the packing consists of thin-walled material, the fastening of the collars, which may be done by welding, screwing or riveting is an expensive manufacturing step.

When using packing elements without fixed collars attached to each boundary element of the packing a sealing has to be guaranteed by a loose collar. When about to be assembled, the loose collars are first placed horizontally along the column wall, then the packing elements are mounted. Finally the packing elements are pushed from a central position against the wall. Thereby the collar is stretched towards the wall and therefore put under tension by the compression force resulting from the packing. The loose collars according to the prior art are not flexible and consequently do not provide an adequate sealing. This has the consequence that in operation a liquid by-pass occurs next to the column wall, which results in a decrease of the column performance. Due to their geometrical arrangement, the loose collars may be flattened and destroyed in particular, when the packing has to be assembled into a column wall, which has a horizontal longitudinal axis.

SUMMARY OF THE INVENTION

The problem of the invention is to provide a solution which is less costly than the above-mentioned prior art and by which a liquid by-pass along the column wall can be largely avoided.

The problem is solved by a crown element for securing a packing in a mass transfer column, comprising an elongate sheet, which comprises a roof element, a wall element and a bottom element. The wall element is arranged between the roof element and the bottom element, such that a first bending line is formed between the roof element and the wall element. A second bending line is formed between the wall element and the bottom element. The roof element is disposed with a plurality of incisions. The bottom element is disposed with a plurality of grooves, whereby the number of incisions is smaller than the number of grooves.

The roof element has a roof element edge and the incisions extend from the roof element edge to the first bending line. Thereby, at least some of the incisions may cover only a portion of the distance between the roof element edge and the first bending line. In an advantageous embodiment, the incisions may be cuts.

The bottom element has a bottom element edge wherein the grooves extend from the bottom element edge to the second bending line.

Advantageously, a protrusion can be arranged on the wall element.

In a preferred embodiment, a portion of the incisions are arranged in a staggered way with respect to the grooves. Thereby, a liquid by-pass along the column wall can be avoided. Any liquid trickling down the common wall gets caught by the roof element and is directed through the incisions toward the packing. If for some reason a portion of this liquid passes the first bending line, it is most likely that it passes the first bending line at a location where the incisions were present. When trickling down further, the liquid encounters the second bending line. There, the liquid might be either directed to the nearest groove or alternatively to an opening provided in the wall element. Thereby, the liquid will pass this opening in the wall element and be directed towards the packing.

At least one of the wall element, the roof element and the bottom element has, in a preferred embodiment, a thickness of from 0.05 to less than 0.2 mm. A sheet of a smaller thickness as compared to the prior art can follow the curvature of the column wall more accurately. Therefore, any leaks between the first bending line and the column wall are avoided to a large extent.

Thus, compared to the prior art, the number of incisions is kept smaller than the number of grooves. A consequence thereof is, that the roof element segments increase in length. This has the consequence that such longer roof element segments are less likely to follow the curvature of the column wall. For this reason, the number of the incisions in the prior art usually corresponds to the number of grooves.

Surprisingly, it could be shown by the inventors, that by foreseeing longer and/or higher roof element segments, the curvature of the column wall was more accurately followed by the roof element segments when installed in the column.

The roof element edge also follows the curvature of the column wall due to the warpage of the roof element segment, in particular when the thickness of the roof element is small, thus in the range of 0.05 to less than 0.2 mm.

An opening can be provided in at least one of the wall element, the roof element or the bottom element. Such an opening is used for directing any liquid, which trickles along the column wall back towards the packing. Such by-pass liquid can thus participate again in mass transfer when directed to the packing. Therefore the performance of the mass transfer column can be improved.

A spacer element can be provided on the wall element. Such a spacer element can be provided to increase the mechanical stability of the wall element. These spacer elements can be protrusions and can have any of the shapes according to U.S. Pat. No. 6,170,805.

The roof element is preferably arranged in an angle of 5 to 60° relative to the wall element, preferably in an angle of 10 to 40° before assembly. This angle decreases when the crown element is in its assembled state in the column. The angle after assembly is about 2° up to 30°, preferably 5° up to 20°. The packing fits only into the column when the roof element is deformed. That means the angle between the roof element and the wall element decreases.

The roof element is composed of a plurality of roof element segments and the bottom element is composed of a plurality of bottom element segments, wherein each roof element segment has a length, which is at least for one of the roof element segments greater than the length of the bottom element segment. The length of the roof element segment or the bottom element segment is the dimension extending substantially in the direction the column wall, thus in horizontal direction if the axis of the mass transfer column is vertical.

The length of the roof element segment is the distance between two neighbouring incisions. The length of the bottom element segment is the length between two neighbouring grooves. If the incision or the groove is for instance v-shaped, the length is the dimension measured from the lowermost point of the v, thus the edge point or the deepest point formed by valley of v-shape. It is to be noted that depending on the installation position of the crown element, the edge point of the incision or the groove can be the highest point of the incision or the groove. Therefore the definition above relates to the general concept of a v-shape and not to the position of installation of the crown element.

The roof element segment preferably has a length which is in the range of 40 to 120 mm, particularly preferred in a range of 60 to 90 mm.

The roof element has preferably a height which is in a range of 15 and 40 mm, particularly preferred in a range 25 to 35 mm. The height of the roof element is the dimension extending substantially normally to the length of each roof element segment. The height of the roof element is thus the distance measured between the first bending line and the roof element edge.

Thus, the height of the roof element and thus the height of each of the roof element segments is greater than the height of corresponding prior art solutions, which additionally improves the alignment of the roof element segments to the curved column wall. Thus according to a preferred embodiment the roof element edge has a curved shape. In other words, the roof element edge follows the curvature of the column wall due to the possibility of warpage mentioned previously, which is not possible if the height of the roof element segment is less than 15 mm and the thickness of the roof element segment is about 2 mm or more.

A further consequence of the modification of the length and height dimensions of the roof element segments is the decrease of the angle between the roof element and the column wall when assembled.

Alternatively, or in addition thereto, the bottom element has a bottom element edge, which has a curved shape. In particular if the thickness of the bottom element is in the range of 0.05 up to less than 2 mm, the bottom element edge follows the curvature of the packing contour due to the possibility of warpage mentioned previously.

A crown element in accordance with any one of the preceding embodiments comprises a first surface and a second surface, wherein the first surface is substantially of the shape of a trapezoid and the second surface is substantially triangular.

A mass transfer column contains a packing and further comprises a tubular wall. The packing is disposed within the tubular wall. A crown element according to any of the preceding embodiments is arranged between the tubular wall and the packing.

The wall element is in contact with the packing when assembled and the wall element is spaced from the column wall when placed inside the column wall. The roof element and the bottom element extend from the wall element at an oblique angle relative to the wall element such that the roof element extends into the direction of the column wall and the bottom element extends into the direction of the packing whereby the crown element is elastically deformable as to exert a holding force onto the packing to fix the packing within the column wall in such a position as to enable a mass transfer to be performed when the mass transfer column is in its operational state.

The packing can comprise a plurality of packing elements and each of the packing elements can comprise a plurality of packing segments, in particular for columns which large diameters.

BRIEF DESCRIPTION OF THE DRAWINGS

FIG. 1 is a detail of a cross-section of a crown element;
FIG. 2 is a front view on a crown element according to FIG. 1;
FIG. 5 shows a top view onto the packing;
and
FIG. 6 shows a detail of the flow on the edge of the packing.

DESCRIPTION OF THE PREFERRED EMBODIMENTS

Figure 3:
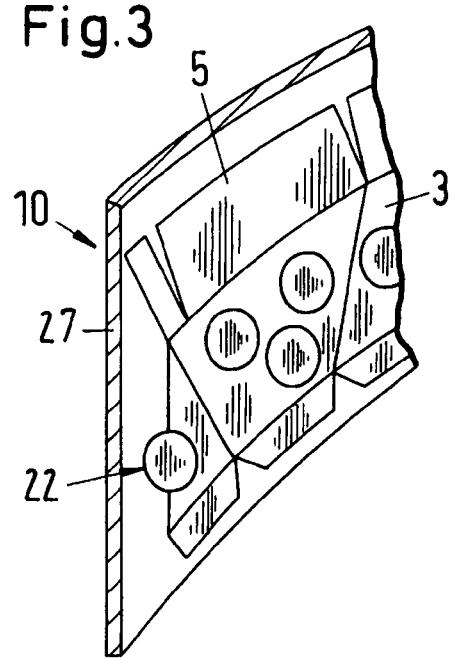
FIG. 3 is a portion of a crown element according to FIG. 1 arranged inside a column wall.

FIG. 1 is a detail of a cross-section of a crown element 3. The crown element 3 comprises an elongate sheet 4, of which a portion is shown also in FIG. 2. This elongate sheet 4 comprises a roof element 5, a wall element 6 and a bottom element 7. The wall element 6 is arranged between the roof element 5 and the bottom element 7. The roof element is arranged in an angle 13 with respect to the wall element 6. Also the bottom element 7 is arranged in an angle 14 to the wall element 6.

The wall element 6 can comprise a protrusion 16. Such a protrusion could be a rib extending essentially in parallel to the first and second bending lines, it can also comprise a plurality of bubble-like elements. The protrusion 16 serves in the assembled state of the crown element to keep a distance, the edge gap 12 between the column wall 10 as seen in FIG. 3 and the wall element 6.

FIG. 2 is a front view of a portion of an elongate sheet 4 constituting a crown element according to FIG. 1. The elongate sheet 4 is composed of a roof element 5, a wall element 6 and a bottom element 7. The wall element 6 is connected to the roof element 5 and to the bottom element 7. A first bending line 8 is formed between the roof element 5 and the wall element 6. A second bending line 9 is formed between the wall element 6 and the bottom element 7.

The roof element 5 is disposed with a plurality of incisions 15. The roof element 5 has a roof element edge 18. The roof element edge 18 extends substantially in parallel to the first bending line 8. The incisions 15 extend from the roof element edge 18 to the first bending line 8. At least some of the incisions can also extend only over a portion of the roof element 5. According to a preferred embodiment, the incisions are formed as cuts.

The bottom element 7 is disposed with a plurality of grooves 17. In a preferred embodiment, the grooves have a v-shape. The number of incisions 15 is smaller than the number of grooves 17.

The wall element 6 comprises a series of first surfaces 31 and second surfaces 32, wherein the first surface 31 is substantially of the shape of a trapezoid and the second surface 32 is substantially triangular. Preferably, the wall element 6 is composed of a plurality of first surfaces 31 and second surfaces 32. Each of the first surfaces 31 touches two neighbouring second surfaces 32 along a pair of common edge lines 33, 34. Each of the common edge lines 33, 34 can also be a bending line. Each of the second surfaces 32 touches two neighbouring first surfaces 31 along a pair of common edge lines 34, 35. Each of the common edge lines 34, 35 can also be a bending line.

As indicated in FIG. 2, the first surfaces 31 and second surfaces 32 of the wall element 6 are disposed in alternating manner longitudinally of the wall element and each respective bending line 33, 34 is disposed between a respective first surface 31 and a respective second surface 32.

FIG. 3 is a portion of a crown element 3 arranged inside a column wall 10. In FIG. 3, the crown element 3 is shown in perspective separated from the packing, but nevertheless arranged at its point of use in the column wall 10. The crown element 3 may be produced very simply from an elongate sheet 4, such as a strip of foil.

Figure 4:
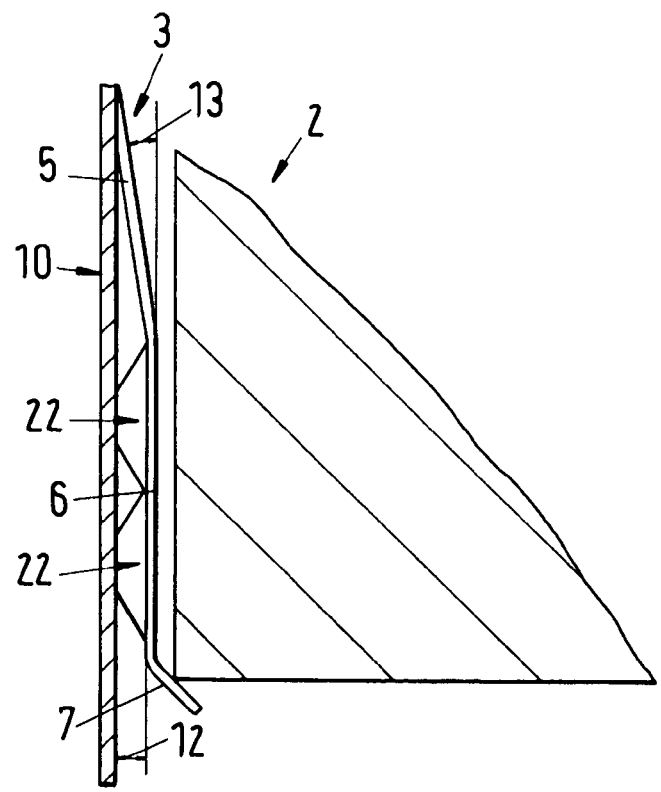
FIG. 4 is the cross-section of FIG. 1, showing the crown element and the packing.

FIG. 3 also shows that the roof element 5 substantially covers the edge gap 12. The incisions 15 are provided in the roof element 5 which are designed for helping the bending of the roof element at an oblique angle with respect to the wall element. When the wall element 6 is bent from a planar elongate sheet 4 to a cylinder surface, the roof element 5 can be bent due to the fact that by provision of the incisions a plurality of v-shaped gaps can be formed. These gaps are shown in FIG. 3. Between the incisions 15, tabs are formed. When folding the roof element 5 along the first bending line 8, the roof element 5 substantially covers the edge gap 12, as shown in FIG. 4 or FIG. 5. The liquid which arrives at the column wall when the column is in its operational state is conducted back again to the packing by the roof element 5.

Due to the fact that the thickness of the roof element 5 is in a range of 0.05 to 0.2 mm, the roof element can easily be deformed from a cylindrical shape to a substantially conical shape. The wall element 6 substantially retains the cylindrical shape. Also the bottom element 7 is bent, however the bending direction is opposite with respect to the roof element 5.

FIG. 4 shows a cross-section of the crown element 3 in its assembled state. Additionally a portion of a packing 2 is shown, which is positioned at a defined location in the column by means of the crown element 3. The roof element 5 can be also bent before the packing and the crown element are assembled into the column wall. The angle 13 between the roof element 5 and the wall element 6 can be larger before insertion of the crown element 3 into the column wall than after this insertion. Therefore the roof element is subjected to a bending moment and a force acting in a direction normal to the column axis. This bending moment and force help to retain the crown element 3 at the desired location within the column. In other words, the roof element 5 can act as a spring.

As distinct from the known collars the crown element 3 of the invention is a separate component which is not fastened to the edge of the packing and is held firmly in the edge gap 12 between the column wall 10 and the packing 2 by spring forces and/or frictional forces.

In addition, the wall element 6 can be disposed with a spacer element 22, which can be in particular formed as a plurality of protrusions 16. When assembled the protrusions 16 are in contact with the column wall. If the depth of the protrusions plus the diameter of the wall element 6 exceed the inner diameter of the column, a compressive force acts on the protrusions. This compressive force helps to keep the protrusions and consequently the wall element 6 in a desired position within the column. Thus, a combination of a frictional force and a spring force helps to keep the crown element 3 in the column. Moreover it is kept in the correct orientation, in particular a vertical orientation of the wall element 6.

The bottom element 7 helps to hold the packing 2 in the desired position and/or orientation as shown in FIG. 4. The bottom element 7 is at least partially squeezed between a first and a second packing element as it extends into the gap between two neighbouring packing elements arranged above each other. Due to the fact that the first and second packing elements form a stack of packing elements, at least the edge of the bottom element is fixed in its position between the two packing elements. This has the consequence that the entire crown element 3 is fixed at the correct position in the mass transfer column. In case of a mass transfer column with a vertical column axis, the correct position is the horizontal position. The bottom element helps to redirect any liquid trickling down the column wall back to the packing. FIG. 5 shows part of the annular or edge gap 12 which lies between the wall 10 of the mass transfer column 1 and the packing 2. The packing layers are composed of corrugations 20 and 21 folded in a zigzag, conduct the liquid in the direction of arrows 25 from the interior of the packing to the edge which is formed by edges 200 and 210 of the corrugations, or respectively in the reverse direction in accordance with arrows 26. The conditions at the edge of the packing are illustrated by FIG. 6. The partially shown corrugations 20 and 21 touch at points C and C' and have a film of liquid trickling over them. Through the liquid conducted outwards over the corrugation 20 as shown by arrow 25, a stronger flow of liquid is formed at the edge 200, as indicated by the arrows 27. Part of this flow according to arrows 27 changes over at the projections A, A', A" onto the edge 210 of the adjacent corrugation 21 to points B, B' as shown by arrows 28, where the liquid is subsequently conducted back into the interior of the packing as shown by arrows 26. If contact between the packing 2 and the column wall 10 had existed, the liquid conducted to the edge would have had the tendency to flow along the inner surface 11 of the column wall 10.

An opening can be provided in at least one of the wall element 6, the roof element 5 or the bottom element 7. Openings permit the liquid which is being conducted away from the column wall 10 to pass the crown element. These openings may be of a similar shape as the openings in document U.S. Pat. No. 6,170,805 B1.

The mounting of the packing is performed segment by segment. In doing so, for example, on the previously built-in segment of packing first of all the crown elements 3 are distributed along the circumference of the cross-section of the column. The following segment of the packing is then pushed into the ring formed by the crown element 3, in doing which the crown elements 3 are pressed against the column wall 10.

A mass transfer column 1 with crown elements 3 made in accordance with the invention exhibits per section of packing at least one ring of crown elements closed over the circumference; the ring may also consist of merely one crown element. The crown elements are advantageously produced from essentially the same material as the packing. The material of the packing or crown elements preferably consists of a metal alloy. Alternatively the crown element may be made from plastics. The packing represented in FIGS. 1 and 2 is to be understood merely as an example. Thus the packing may exhibit any structure which brings about a distribution of fluids being treated in directions transverse to the line of fall. The crown elements like the packing are advantageously produced from a foil-like material of which the wall thickness lies in the range between 0.05 and 2 mm, preferably at around 0.15 mm.

What is claimed is:

1. A crown element for securing a packing in a mass transfer column comprising
an elongate sheet having a thickness of from 0.05 to less than 0.2 mm and including a wall element, a roof element extending from said wall element with a first bending line between said wall element and said roof element and a bottom element extending from said wall element with a second bending line between said wall element and said bottom element,
said roof element having a plurality of incisions to separate said roof element into a plurality of elastically deformable roof element segments,
said bottom element having a plurality of grooves to separate said bottom element into a plurality of elastically deformable segments wherein the number of said incisions is smaller than the number of said grooves, and
said wall element comprises a plurality of first surfaces of triangular shape, a plurality of second surfaces of trapezoidal shape disposed in alternating manner with said first surfaces longitudinally thereof and a plurality of bending lines each said line being disposed between a respective first surface and a respective second surface.

2. A crown element in accordance with claim 1 wherein said roof element has a roof element edge and wherein said incisions extend from said roof element edge to said first bending line.

3. A crown element in accordance with claim 2 wherein at least some of said incisions cover only a portion of the distance between said roof element edge and said first bending line.

4. A crown element in accordance with claim 1 wherein said bottom element has a bottom element edge and wherein said grooves extend from said bottom element edge to said second bending line.

5. A crown element in accordance with claim 1 wherein said wall element has at least one protrusion thereon.

6. A crown element in accordance with claim 1 wherein said roof element is arranged at an angle of 5 to 60° relative to said wall element.

7. A crown element in accordance with claim 1 wherein said roof element is composed of a plurality of roof element segments, each said roof element segment having a length in a the range of from 40 to 120 mm.

8. A crown element in accordance with claim 1 wherein said roof element has a height in a range of from 15 to 40 mm.

9. A crown element according to claim 1 wherein at least a portion of said grooves is arranged in staggered relation to said incisions.

10. A crown element in accordance with claim 1 wherein said roof element has a curved roof element edge and said bottom element has a curved bottom element edge.

11. In combination,
a mass transfer column comprising a tubular wall;
a packing disposed within said column wall; and
a crown element arranged between said column wall and said packing for securing said packing in said mass transfer column, said crown element including an elongate sheet having a roof element, a wall element and a bottom element, said wall element being arranged between said roof element and said bottom element, a first bending line between said roof element and said wall element, a second bending line between said wall element and said bottom element, said roof element having a plurality of incisions, said bottom element having a plurality of grooves and characterized in that the number of said incisions is smaller than the number of said grooves and at least one of said wall element, said roof element and said bottom element has a thickness of 0.05 to less than 0.2 mm and said wall element comprises a plurality of first surfaces of triangular shape, a plurality of second surfaces of trapezoidal shape disposed in alternating manner with said first surfaces longitudinally thereof and a plurality of bending lines, each said line being disposed between a respective first surface and a respective second surface.

12. The combination according to claim 11 wherein said wall element is in contact with said packing and spaced from said column wall, said roof element and said bottom element extending from said wall element at an oblique angle relative to said wall element such that said roof element extends into the direction of said column wall and said bottom element extends into the direction of said packing whereby said crown element is elastically deformable as to exert a holding force onto said packing to fix said packing within said column wall in a position as to enable a mass transfer to be performed when said column is in an operational state.

13. The combination according to claim 12 wherein said packing comprises a plurality of packing segments.

14. The combination according to claim 12 wherein said bottom element is at least partially squeezed between a first and a second packing element.

* * * * *